(No Model.)
C. B. SCHOENMEHL.
GALVANIC BATTERY.
No. 591,427. Patented Oct. 12, 1897.
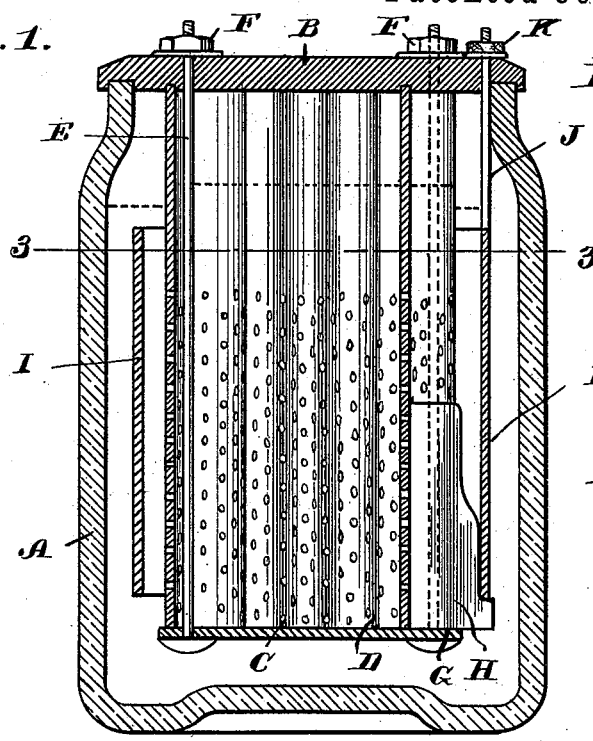
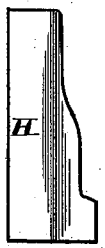
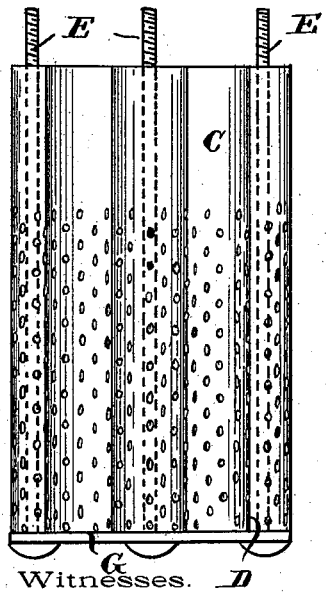
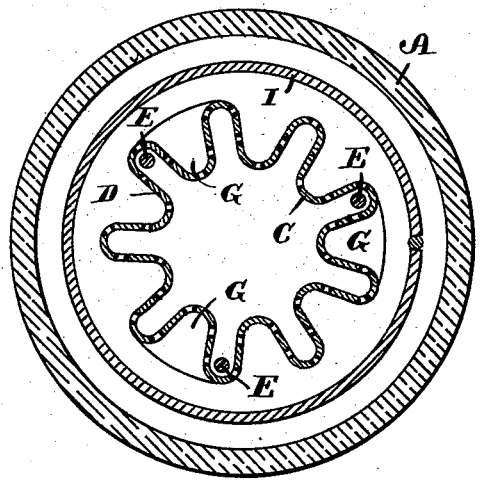
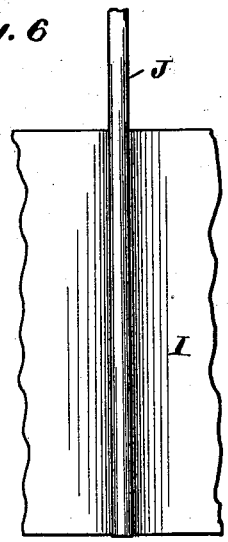
Witnesses.
H. C. Newman
R. H. Newman.
Inventor.
CHARLES B. SCHOENMEHL
By
Chamberlain & Newman
Attorneys

UNITED STATES PATENT OFFICE.

CHARLES B. SCHOENMEHL, OF WATERBURY, CONNECTICUT.

GALVANIC BATTERY.

SPECIFICATION forming part of Letters Patent No. 591,427, dated October 12, 1897.

Application filed February 2, 1897. Serial No. 621,601. (No model.)

*To all whom it may concern:*

Be it known that I, CHARLES B. SCHOENMEHL, a citizen of the United States, and a resident of Waterbury, in the county of New Haven and State of Connecticut, have invented certain new and useful Improvements in Galvanic Batteries, of which the following is a specification.

My invention relates to new and useful improvements in galvanic batteries which comprise a positive and negative element consisting of a zinc and a basket containing a depolarizing agent, respectively, together with a suitable exciting fluid—for instance, caustic soda.

It is the object of my invention to improve upon batteries of the above class by so constructing and arranging the elements as to increase their efficiency, durability, and life, as will later be more fully explained.

With the above objects in view I have devised the simple and novel construction shown in the accompanying drawings, and of which—

Figure 1 is a central vertical section. Fig. 2 is a detached side view of my novel basket which constitutes the negative element of the battery. Fig. 3 is a sectional plan view of my battery, taken on line 3 3 of Fig. 1. Fig. 4 is a detail side view of one of the insulating-blocks H, which rest upon projections of the bottom and support the zinc ring. Fig. 5 is a detail plan view showing clearly the manner in which the binding-wire is attached. Fig. 6 is a detail elevation of the parts shown in Fig. 5.

The same characters of reference denote like or corresponding parts upon the several figures of the drawings.

A indicates a common form of glass jar, such as is employed in batteries of this class.

B is a tin or porcelain cover for said jar, and to which I attach a specially-formed perforated tin or similar sheet-metal basket C, in which is introduced a quantity of oxid of copper, or similar depolarizing material. Said basket is provided with a series of corrugations D upon its periphery, as shown in the several figures of the drawings. The object in corrugating the side walls of the basket is to increase its exterior surface, thereby more readily exposing the contents thereof in a manner to more effectually act upon the positive element, thus increasing its force of action. The bottom of the basket C is also of sheet metal and preferably made in a separate piece and secured thereto by means of bolts E, which pass through said bottom and up through the inside of the basket near its periphery and finally out through the cover B, where they are provided with a nut F, which is screwed down tight in a manner to clamp the three parts—viz., the bottom, basket, and cover—firmly together. Said bottom, as will be obvious, has its periphery cut to correspond with the peripheral corrugations in the basket, except at certain intervals, where said bottom is carried across one of the concave surfaces of said corrugations for the purpose of forming supports G for the special insulating-blocks H, which rest in said concaves and upon the projecting bottom. These insulating-blocks H are preferably formed of porcelain and consist of a body portion whose shape on back practically corresponds with the concave in which it fits, also a projection having a narrow top edge upon which the zinc ring I rests. Said ring forms the positive element of the battery and is provided with a wire connection J, laid between the connecting ends of said zinc and soldered thereto, thereby securing a reliable, positive, and improved connection of the zinc and wire. The upper end of said wire passes through the cover and is provided with a binding-screw K, as shown.

Having thus described my invention, what I claim, and desire to secure by Letters Patent, is—

1. In a primary battery of the class described, the combination of a jar provided with a cover, a basket forming an electrode attached to said cover and having a corrugated peripheral surface, a depolarizing material within said basket, projections upon the bottom of said basket, insulating-blocks adapted to fit upon said projections and to support a zinc, a zinc encircling said basket and having a binding-screw connection.

2. In a galvanic battery of the class described, the combination of the jar, a cover fitted thereto, a perforated corrugated conducting-basket containing a suitable depolarizing material, bolts passing through said basket securing the bottom and cover thereto, detachable insulating-blocks resting upon projections of the bottom of the basket, a circular zinc supported upon said blocks, substantially as described.

3. In a galvanic battery of the class described, the combination of the jar, a cover fitted thereto, a conducting-basket within said jar and containing a depolarizing agent, an annular zinc encircling said agent and provided with a conducting-wire secured between the adjacent vertical edges of said zinc, substantially as described.

Signed at Bridgeport, in the county of Fairfield and State of Connecticut, this 25th day of January, A. D. 1897.

CHARLES B. SCHOENMEHL.

Witnesses:
C. M. NEWMAN,
L. J. UNWIN.